Oct. 31, 1939.　　　　　E. K. CLARK　　　　　2,178,066
FLEXIBLE REMOTE CONTROL COUPLING
Filed Jan. 10, 1938
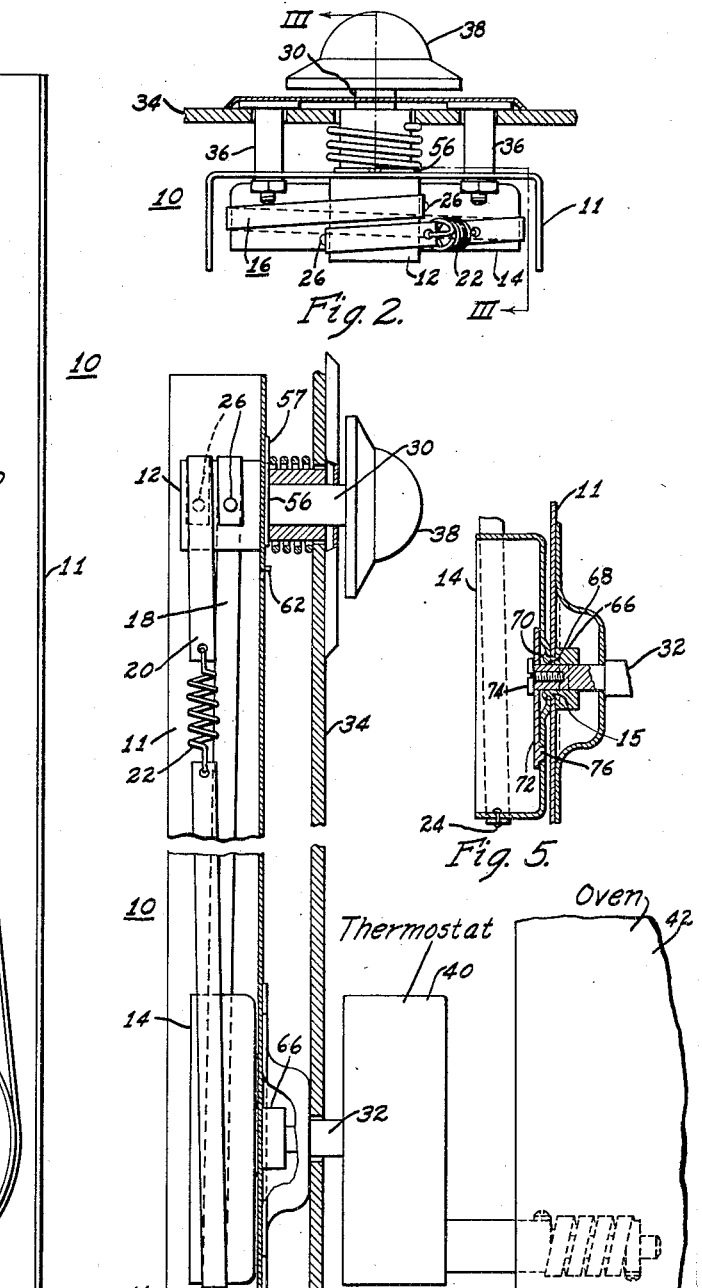
INVENTOR
Earl K. Clark.
BY
W. R. Coley
ATTORNEY
WITNESSES:
Leon M. Gorman Patented Oct. 31, 1939

2,178,066

UNITED STATES PATENT OFFICE 2,178,066

FLEXIBLE REMOTE CONTROL COUPLING

Earl K. Clark, Mansfield, Ohio, assignor to Westinghouse Electric & Manufacturing Company, East Pittsburgh, Pa., a corporation of Pennsylvania Application January 10, 1938, Serial No. 184,260

1 Claim. (Cl. 74—501)

My invention relates to a flexible coupling and, more particularly, to a flexible remote control coupling for use with range oven thermostats, or the like.

An object of my invention is to provide an efficient, compact, rugged, fool-proof remote control device having a minimum number of parts which may be readily operatively associated with a range oven thermostat, or the like.

A further object of my invention is to provide a flexible coupling which will provide a smooth, easy, even operation between a driving shaft and a driven shaft.

A further object of my invention is to provide a flexible anchored or non-slipping belt or chain coupling which will permit a wide range of operation such as substantially 360° of one of the cooperating shafts.

A further object of my invention is to provide a flexible remote control device in which there will be no lost motion or back lag between the operation of the driving and the driven shaft.

A still further object of my invention is to provide a flexible remote control coupling device which will prevent a bending moment from being transmitted from the coupling device to the cooperating shafts.

Other objects of my invention will either be pointed out specifically in the course of the following description embodying my invention, or will be apparent from such description.

In the accompanying drawing:

Figure 1 is a front elevational view of a device embodying my invention;

Fig. 2 is a top plan view of the device shown in Fig. 1 mounted for operation;

Fig. 3 is a sectional view taken along the line III—III of Fig. 2; and

Figs. 4 and 5 are sectional views taken along the lines IV—IV and V—V, respectively, of Fig. 1.

Referring to the accompanying drawing, I show a flexible remote control or coupling device 10 comprising a supporting structure or casing 11, a driving drum or pulley 12, a driven drum or pulley 14 and a flexible band or coupling 16 operatively joining the two drums, a rotation-limiting and bearing device 56 for limiting the rotation of the driving drum 12, and a sleeve or collar fastener 66 for rotatably mounting the driven drum 14 upon the supporting structure 11.

The driving drum or pulley 12 is shown as relatively small compared with driven pulley 14, although this relation is not essential. In this instance, the two drums are rotatably mounted upon the supporting structure 11 and have suitable apertures 50 and 15, respectively, therein for receiving a driving shaft 30 and a driven shaft 32, respectively. It is to be understood that the driving shaft 30 and driven shaft 32 may, if desired, be rotatably mounted upon the supporting structure 11 or upon any other suitable device, and that the drums 12 and 14 respectively may be rigidly attached to said shafts.

The driving drum 12 has a metallic sleeve 52 inserted in an aperture 50 within the drum. The rotation limiting device is then placed over the outer end of sleeve 52 which extends through supporting structure 11, the end of the sleeve being spun over upon the limiting device 56, as shown at 54 in Fig. 4. The rotation limiting device 56 has a protruding finger 57 in the plane thereof, as shown by dotted lines in Fig. 1, to limit the rotation of the drum 12, as hereinafter described. The driving drum 12 is thus rotatably mounted upon the supporting structure 11, which will prevent any biasing action or moment to be transmitted from the drum to its cooperating shaft 30.

The driven drum 14 is rotatably mounted upon the supporting structure 11 by means of the sleeve or collar fastener 66. The collar fastener 66 has a protruding sleeve portion 68 which, when mounting the drum 14, is inserted through an aperture 15 within the supporting structure 11. The drum 14 is then placed upon the sleeve portion 68 whereupon the sleeve is spun over upon the drum 14, as shown in Fig. 5.

The driven shaft 32 is inserted through collar 66 and drum 14 where it is rigidly attached to the drum 14 by means of link 72. The link 72 cooperates with the squared end of the shaft 32 and an aperture 76 within the drum 14. The link is held tightly against the shaft 32 and drum 14 by means of shoulder screw 74 which cooperates with the end of shaft 32.

The flexible band or coupling 16 comprises a long strap-like structure which, in this instance, has the ends thereof overlapping only approximately half a turn and rigidly attached to the periphery of the upper or driving pulley 12, by means of suitable set screws or rivets 26. The flexible coupling 16 includes a long portion 18, a short portion 20 and a resilient member 22, for, among other things, compensating for expansion and contraction of the band due to changes of temperature. The long portion 18 is rigidly attached to the driving pulley 12 at one end, as hereinabove described, and is wound about the lower or driven pulley 14 extending beyond such pulley. The portion 18 is then rigidly attached to the driven pulley 14 by rivet 24 or any other suitable device. The short portion 20 of the flexible coupling means is likewise rigidly attached at one end to the driving pulley 12. The resilient member 22 is then attached to the free ends of the long and short portions 18 and 20, respectively, thus being in tension, substantially as shown in Fig. 1. With the flexible coupling formed in such a manner, it is apparent that the rotational energy produced at the driving pulley 12 will be readily transmitted to the driven pulley 14 without any loss in energy or any back-lash.

The ends of the band portions 18 and 20, which are attached to the driving pulley 12, are wound about such driving pulley 12, substantially as shown in the accompanying figures, and in this instance, are riveted to such pulley at a point substantially 180° beyond that which the bands originally contact the said pulley. With the band portions 18 and 20 rigidly attached to the driving pulley in such a manner, it is apparent that such pulley will be free to rotate substantially twice the included angle between the rivets 26, or, in this instance, substantially 360°. The projecting finger 57 is arranged to engage the one or the other side of stop member 62 as each limit of rotation is reached, thereby preventing strain on the rivets 26 and the adjacent portions of band 16. However, the total permissible amount of rotation of the driving shaft, being substantially twice the included angle between the rivets 26, will depend upon the relative positions of such rivets 26, and as hereinabove described, may be of any predetermined value, depending upon such predetermined positions of the rivets.

The resilient member 22 is in tension, as illustrated, and has a greater value than that required for driving the driven pulley 14 and any load which may be attached thereto, thereby preventing the spring from being stretched beyond the elastic limit and becoming improperly operative. It is apparent that there cannot be any lost motion between the movement of the driving pulley 12 and the driven pulley 14.

With the long portion 18 of the flexible coupling 16 rigidly attached to the driven pulley 14 by means of rivet 24, it is apparent that there will be no slipping or movement between the pulley 14 and the flexible coupling 16. It is, therefore, apparent that all the rotational energy produced at the driving pulley 12 will be transmitted to the driven pulley 14 without any lost motion, slippage or back-lash.

The remote control device 10, hereinabove described, as shown in Figs. 2 and 3, may be rigidly attached to a range back splasher 34, for example, by means of suitable shoulder screws 36. The driving shaft 30, rigidly attached to the driving pulley 12, then extends through the back splasher 34 and, in this instance, has an oven control knob 38 operatively associated therewith. The driven shaft 32 likewise extends through the back splasher 34 where, in this case, it is operatively associated with any suitable adjustable thermotatic device 40 which extends, within the range oven 42, substantially as shown in Fig. 3. With the remote control device embodying my invention rigidly attached to a range back splasher, as hereinabove described, it is apparent that the control knob 38 will, by means of the flexible coupling 16, readily operate and control the thermostatic device 40, with a smooth, easy, even operation, and without any lost motion or back-lash.

Various modifications may be made in the device embodying my invention without departing from the spirit and scope thereof, and I desire, therefore, that only such limitations shall be placed thereon as are imposed by the prior art and the appended claim.

I claim as my invention:

In a remote control device for a thermostat, a supporting structure, a driving drum and a driven drum including operatively associated shafts rotatably mounted upon said structure, a flat, flexible, band operatively associated with said drums, said band being wrapped around the driven drum for substantially a half turn, the free ends of said band being wrapped around the driving drum in opposite directions for substantially a half turn in a central position of the driven drum, the free ends of said band being secured to the driving drum at radially opposite points thereon whereby the driving drum may be rotated a half turn in either of two directions away from said central position, and a resilient member operatively associated with the flexible band for maintaining a tension in the band greater than that required to drive the driven shaft by the driving shaft.

EARL K. CLARK.